United States Patent
Sagata et al.

(10) Patent No.: US 8,079,350 B2
(45) Date of Patent: Dec. 20, 2011

(54) BLOW-BY GAS RECIRCULATION STRUCTURE FOR INTERNAL COMBUSTION ENGINE

(75) Inventors: Munehiro Sagata, Toyoake (JP); Koji Nishiyama, Nagoya (JP)

(73) Assignee: Aichi Machine Industry Co., Ltd., Nagoya-shi (JP)

( * ) Notice: Subject to any disclaimer, the term of this patent is extended or adjusted under 35 U.S.C. 154(b) by 453 days.

(21) Appl. No.: 12/388,160

(22) Filed: Feb. 18, 2009

(65) Prior Publication Data

US 2009/0301448 A1    Dec. 10, 2009

(30) Foreign Application Priority Data

Jun. 10, 2008 (JP) ................ 2008-152335

(51) Int. Cl.
*F02M 35/104* (2006.01)
*F01M 13/00* (2006.01)

(52) U.S. Cl. ..................................... 123/572

(58) Field of Classification Search .......... 123/572–574, 123/41.86, 306, 308
See application file for complete search history.

(56) References Cited

U.S. PATENT DOCUMENTS

| | | | |
|---|---|---|---|
| 3,839,996 A * | 10/1974 | DeBiasse | 123/572 |
| 6,659,094 B2 * | 12/2003 | Nakamizo et al. | 123/572 |
| 6,681,750 B2 * | 1/2004 | Mashiko | 123/572 |
| 6,705,280 B1 * | 3/2004 | Lippert | 123/306 |
| 2004/0159314 A1 * | 8/2004 | Ishizuka et al. | 123/572 |
| 2005/0235972 A1 | 10/2005 | Yi | |

FOREIGN PATENT DOCUMENTS

| | | |
|---|---|---|
| DE | 19920195 A1 | 11/2000 |
| DE | 10320493 A1 | 12/2004 |
| DE | 102006038831 A1 | 2/2008 |
| EP | 1447-533 A1 | 8/2004 |
| JP | 2005-155454 A | 6/2005 |

OTHER PUBLICATIONS

Extended European Search Report dated Feb. 28, 2011 for the corresponding European Application No. 09002536.2.

* cited by examiner

*Primary Examiner* — M. McMahon
(74) *Attorney, Agent, or Firm* — Global IP Counselors, LLP (57) ABSTRACT

A blow-by gas recirculation structure includes a cylinder head including an intake manifold mounting surface and a cylinder block mounting surface with a first intake passage extending between a first intake opening formed in the intake manifold mounting surface and a first intake port formed in the cylinder block mounting surface, and a second intake passage extending between a second intake opening formed in the intake manifold mounting surface and a second intake port formed in the cylinder block mounting surface. The cylinder head further includes at least one blow-by gas passage for recirculating blow-by gas to the first intake passage. The intake manifold mounting surface has at least one enlarged recess fluidly connected between the blow-by gas passage and the first intake passage, the enlarged recess being disposed between the first and second intake openings and at least partially aligned with centers of the first and second intake openings.

34 Claims, 7 Drawing Sheets

BLOW-BY GAS RECIRCULATION STRUCTURE FOR INTERNAL COMBUSTION ENGINE

CROSS-REFERENCE TO RELATED APPLICATIONS

This application claims priority to Japanese Patent Application No. 2008-152335, filed on Jun. 10, 2008. The entire disclosure of Japanese Patent Application No. 2008-152335 is hereby incorporated herein by reference.

BACKGROUND OF THE INVENTION

1. Field of the Invention

The present invention relates to a blow-by gas recirculation structure and an internal combustion engine equipped with a blow-by gas recirculation structure.

2. Background Information

Japanese Laid-open Patent Publication No. 2005-155454 discloses an example of a blow-by gas recirculation structure in which oil is removed from blow-by gas in a vapor-liquid separating chamber and the blow-by gas is recirculated to a combustion chamber via an intake passage.

In the blow-by gas recirculation structure disclosed in the above mentioned reference, a recess having a comparatively large volume is formed in an intake manifold mounting surface of the cylinder head in a position above an intake passage. The recess is configured to continuously extend along a cylinder alignment direction. Blow-by gas is dispersed and applied to the intake passages through this recess, thereby enabling the blow-by gas to be recirculated to each of the cylinders after having sufficiently absorbed a pressure pulse inside a crankcase.

In view of the above, it will be apparent to those skilled in the art from this disclosure that there exists a need for an improved blow-by gas recirculation structure for an internal combustion engine. This invention addresses this need in the art as well as other needs, which will become apparent to those skilled in the art from this disclosure.

SUMMARY OF THE INVENTION

Since the blow-by gas recirculation structure disclosed in the above mentioned reference has a recess provided in the intake manifold mounting surface of the cylinder head solely for the purpose of pressure pulse absorption, it is difficult or inefficient to secure sufficient space for providing the recess.

Accordingly, one object of the present invention is to provide a blow-by gas recirculation structure with which blow-by gas can be fed to the intake passages of an internal combustion engine in a stable and uniform (balanced) manner while the blow-by gas recirculation structure is secured in an efficient manner.

In order to achieve the above object, a blow-by gas recirculation structure includes a cylinder head including an intake manifold mounting surface and a cylinder block mounting surface with a first intake passage extending between a first intake opening formed in the intake manifold mounting surface and a first intake port formed in the cylinder block mounting surface, and a second intake passage extending between a second intake opening formed in the intake manifold mounting surface and a second intake port formed in the cylinder block mounting surface. The cylinder head further includes at least one blow-by gas passage for recirculating blow-by gas to the first intake passage. The intake manifold mounting surface further has at least one enlarged recess fluidly connected between the blow-by gas passage and the first intake passage, the enlarged recess being disposed between the first and second intake openings and at least partially aligned with centers of the first and second intake openings.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
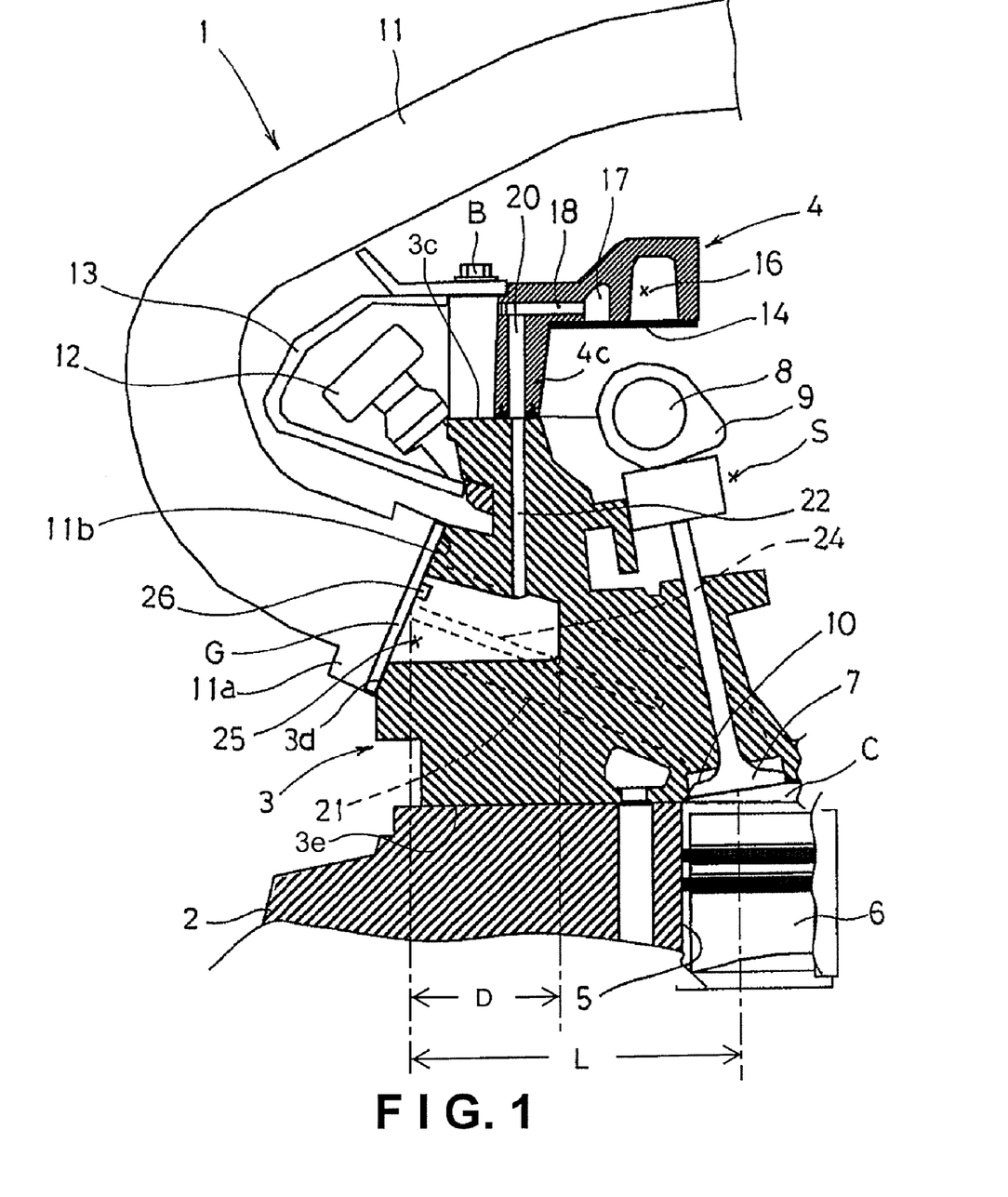
FIG. 1 is a schematic partial cross sectional view of an internal combustion engine according to an embodiment of the present invention as taken along a plane substantially parallel to center axes of cylinders.

Referring initially to FIG. 1, an internal combustion engine 1 provided with a blow-by gas recirculation structure is illustrated in accordance with an embodiment of the present invention. FIG. 1 is a schematic partial cross sectional view of the internal combustion engine 1 as taken along a plane parallel to center axes of cylinders. As shown in FIG. 1, the internal combustion engine 1 has a cylinder block 2, a cylinder head 3, and a cylinder head cover 4. The cylinder head 3 is provided on the cylinder block 2 and the cylinder head cover 4 is provided on an upper surface of the cylinder head 3. The cylinder block 2 defines a plurality of cylinder bores 5 (only one cylinder bore 5 is shown in FIG. 1). A piston 6 is arranged inside each of the cylinder bores 5. The cylinder bores 5 and the cylinder head 3 form a plurality of combustion chambers C (only one combustion chamber C is shown in FIG. 1). The cylinder head 3 defines a valve mechanism chamber S, and a camshaft 8, a cam 9 rotated by the camshaft 8, and an intake valve 7 configured to be opened and closed by the cam 9 are arranged inside the valve mechanism chamber S. The intake valve 7 is configured and arranged to open and close an intake port 10 located in an upper surface of the combustion chamber C.

Figure 2:
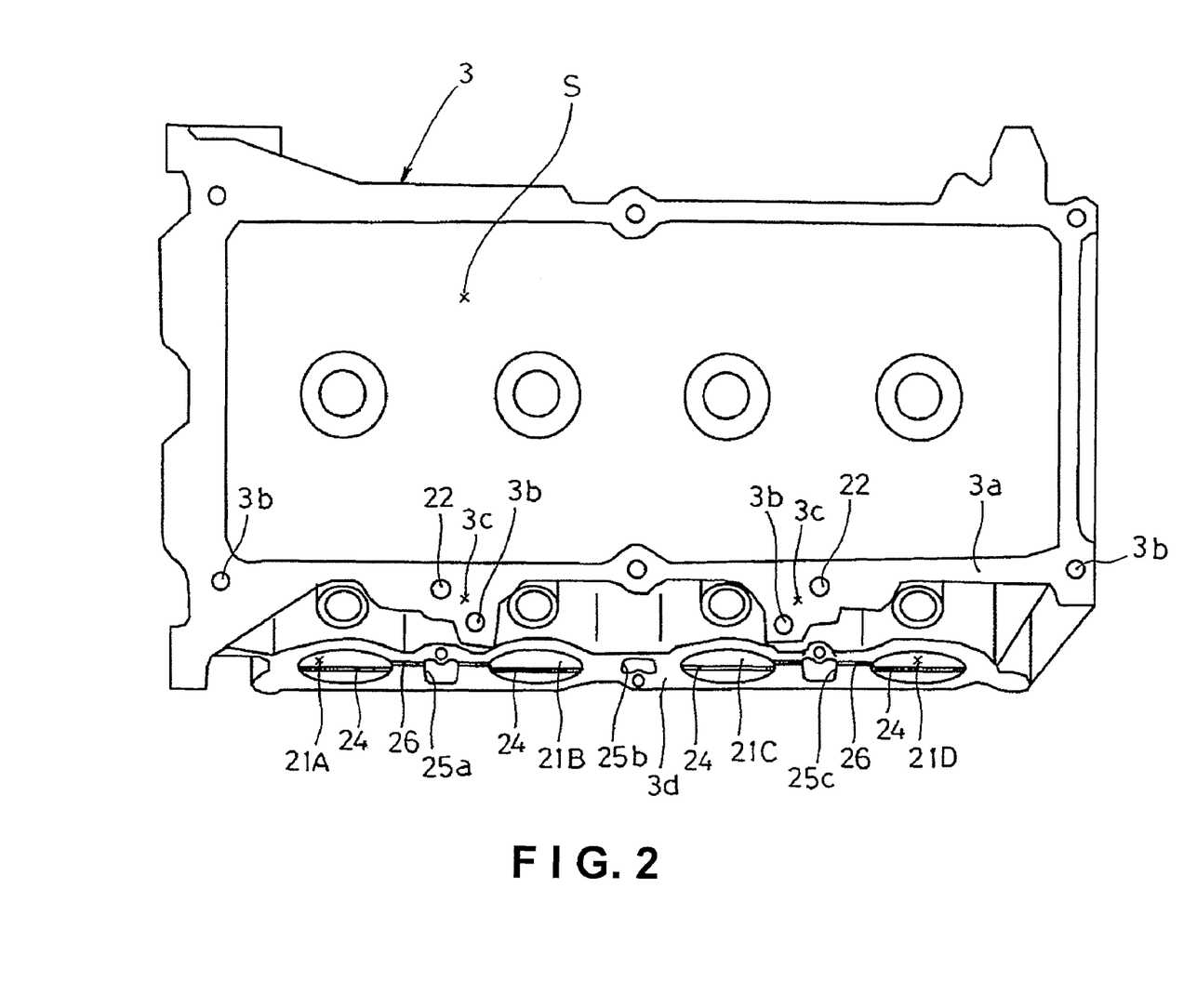
FIG. 2 is a top plan view of a cylinder head of the internal combustion engine according to the embodiment of the present invention.
Figure 3:
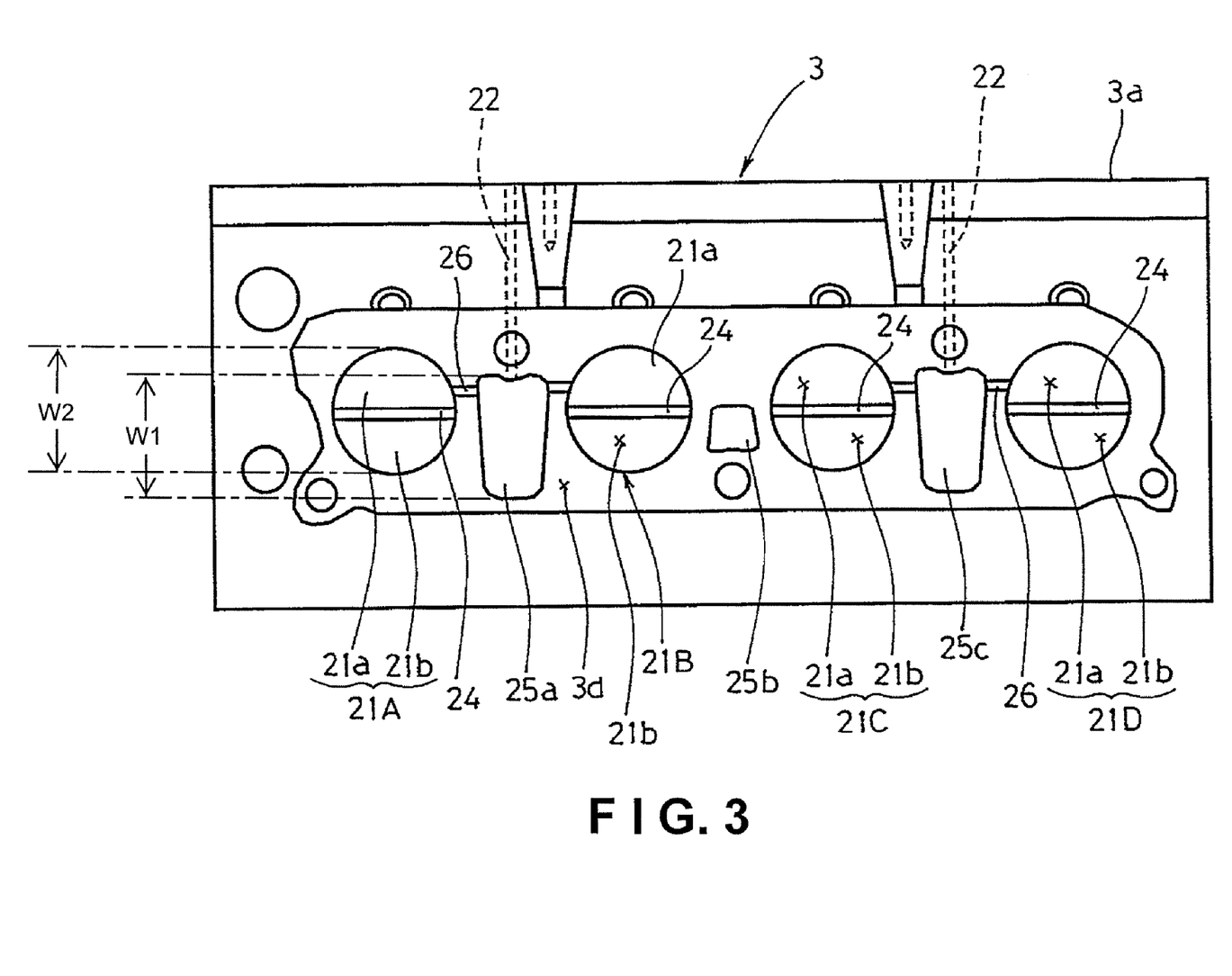
FIG. 3 is a front elevational view of the cylinder head of the internal combustion engine according to the embodiment of the present invention.

FIG. 2 is a top plan view of the cylinder head 3, and FIG. 3 is a front elevational view of the cylinder head 3.

As shown in FIGS. 1 to 3, four intake passages 21 (i.e., first to fourth intake passages 21A, 21B, 21C, and 21D) are formed in the cylinder head 3 so as to be spaced from one another along the cylinder alignment direction. One end of each intake passage 21 opens at the combustion chamber C through the intake port 10 formed in a cylinder block mounting surface 3e, and the other end of each intake passage 21 opens at an intake manifold mounting surface 3d. A mounting flange portion 11a of an intake manifold 11 is mounted to the intake manifold mounting surface 3d with a gasket G being disposed therebetween. The gasket G defines a cylinder head mounting surface 11b of the intake manifold 11 as shown in FIG. 1. The intake manifold 11 communicates with the intake ports 10 through the intake passages 21.

The internal combustion engine 1 is also provided with a fuel pipe 12 and a protective cover 13 protecting the fuel pipe 12 as shown in FIG. 1. As shown in FIG. 3, a tumble plate 24 (a partition) is provided inside each of the first to fourth intake passages 21A, 21B, 21C, and 21D of the cylinder head 3. The tumble plates 24 partition the inside each of the first to fourth intake passages 21A, 21B, 21C, and 21D into an upper sub-passage 21a and a lower sub-passage 21b. The tumble plate 24 is configured to change the flow state of intake air flowing to the combustion chamber C between, for example, a tumbling flow and a swirling flow, and the upper sub-passage 21a functions as a passage through which intake air always flows. More specifically, the upper and lower sub-passages 21a and 21b are arranged so that the upper sub-passage 21a always allows passage of the intake air while the lower sub-passage is selectively closed off by using a conventional method (e.g., providing a tumble control valve on an upstream side of the tumble plate 24, or the like).

the communication groove fluidly connects the one of the sub-passages arranged to always allow passage of the intake air to the enlarged recess.

As shown in FIGS. 1 to 3, the intake manifold mounting surface 3d of the cylinder head 3 has three recess portions (core-cast spaces) 25a, 25b, and 25c that open at the intake manifold mounting surface 3d.

The recess portions 25a, 25b, and 25c are formed between the first to fourth intake passages 21A, 21B, 21C, and 21D in order to reduce the wall thickness between the first to fourth intake passages 21A, 21B, 21C, and 21D (intake passages are generally thick-walled for structural reasons) and suppress the occurrence of shrinkage cavities during casting. Therefore, the recess portions 25a, 25b, 25c are formed to have comparatively large volumes. As seen in FIGS. 2 and 3, the recess portions 25a and 25c are disposed between the openings of the first and second intake passages 21A and 21B, and the openings of the third and fourth intake passages 21C and 21D. The recess portions 25a and 25c are at least partially aligned with centers of the openings of the first and second intake passages 21A and 21B and the openings of the third and fourth intake passages 21C and 21D, respectively. Each of the recess portions 25a and 25c preferably has a depth D of at least twenty percent of a length L of one of the first to fourth intake passages 21A, 21B, 21C, and 21D as measured from the intake manifold mounting surface 3d to the cylinder block mounting surface 3e. More preferably, the depth D of the recess portions 25a or 25c is at least forty percent of the length L of the one of the first to fourth intake passages 21A, 21B, 21C, and 21D as shown in FIG. 1. Also, as shown in FIG. 3, the recess portions 25a and 25c has a width W1 as measured perpendicular to a line connecting centers of the openings of the first and second intake passages 21A and 21C or the third and fourth intake passages 21C and 21D that is at least fifty percent of a width W2 of the openings of the first and second intake passages 21A and 21C or the third and fourth intake passages 21C and 21D as measured perpendicular to the line connecting centers of the openings of the first and second intake passages 21A and 21C or the third and fourth intake passages 21C and 21D.

The intake manifold mounting surface 3d is also provided with a communication groove 26 that communicates between the recess portion 25a (an enlarged recess) and the upper sub-passage 21a of each of the first and second intake passages 21A and 21B and a communication groove 26 that communicates between the recess portion 25c (an enlarged recess) and the upper sub-passage 21a of each of the third and fourth intake passages 21C and 21D. In other words, the communication grooves 26 are formed to communicate between the recess portion 25a and the two intake passages 21A and 21B on both sides of the recess portion 25a and between the recess portion 25c and the two intake passages 21C and 21D on both sides of the recess portion 25c.

As shown in FIGS. 2 and 3, two through holes 22 (blow-by gas passages) that pass from a cylinder head cover mounting surface 3a to the recess portions 25a and 25c, respectively, are formed in the cylinder head 3. Also, a plurality of threaded bolt holes 3b are formed in the cylinder head 3 for installing bolts B to fasten the cylinder head cover 4 securely to the cylinder head 3. As shown in FIG. 2, two protruding wall portions 3c are formed in two locations of the cylinder head cover mounting surface 3a on the side of the cylinder head cover mounting surface 3a that is near the intake manifold mounting surface 3d. The two protruding wall portions 3c are disposed in positions corresponding to the space between the first and second intake passages 21A and 21B and the space between the third and fourth intake passages 21C and 21D. Two of the bolt holes 3b are formed in the protruding wall portions 3c.

Figure 4:
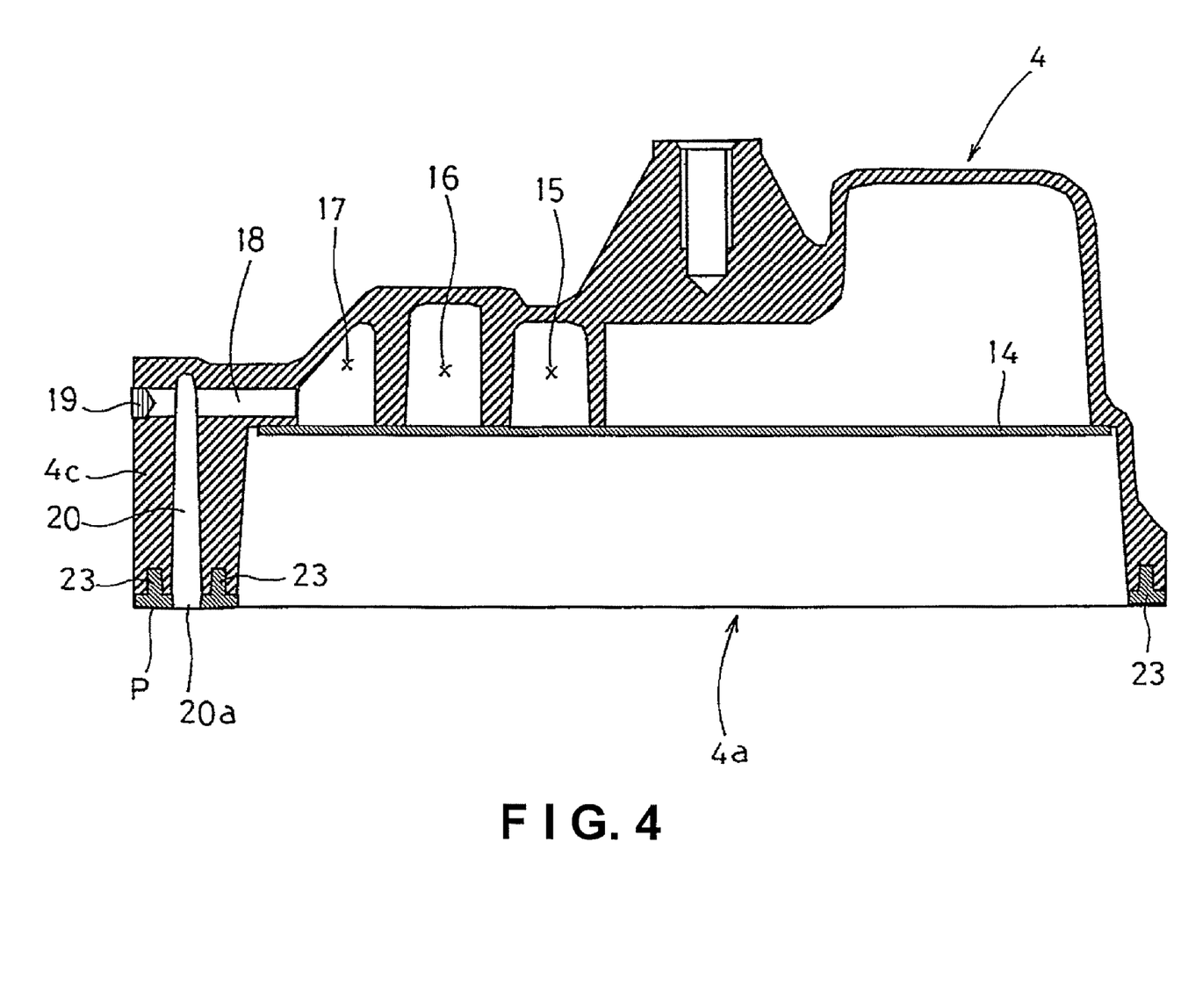
FIG. 4 is a schematic cross sectional view of a cylinder head cover of the internal combustion engine according to the embodiment of the present invention as taken along a plane substantially perpendicular to a cylinder alignment direction.
Figure 5:
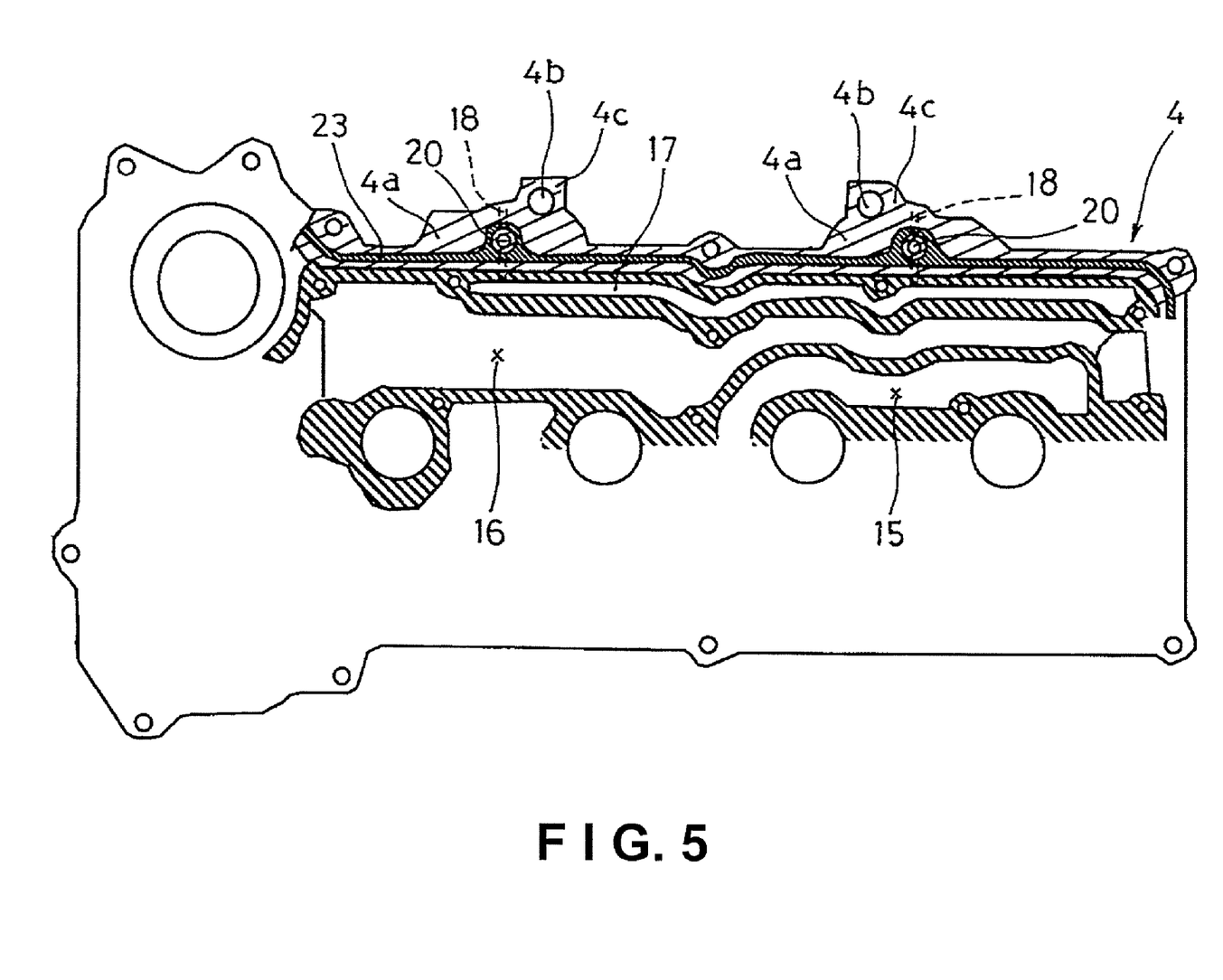
FIG. 5 is a schematic partial cross sectional view of the cylinder head cover of the internal combustion engine according to the embodiment of the present invention as taken along a plane substantially perpendicular to the center axes of the cylinders.

FIG. 4 is a schematic cross sectional view of the cylinder head cover 4 as taken along a plane perpendicular to a cylinder alignment direction, and FIG. 5 is a schematic cross sectional view of the cylinder head cover 4 showing the internal structure thereof in more detail.

As shown in FIGS. 4 and 5, the cylinder head cover 4 has a fresh air introduction passage 15 through which fresh air flows, a vapor-liquid separating section 16 (a part of a vapor-liquid separator passage) configured to separate oil from blow-by gas, and a blow-by gas main passage 17 (a part of the vapor-liquid separator passage) through which blow-by gas flows after passing through the vapor-liquid separating section 16. As shown in FIG. 4, a baffle plate 14 is attached to a lower surface of the cylinder head cover 4 to partition the fresh air introduction passage 15, the vapor-liquid separating section 16, and the blow-by gas main passage 17 from one another and to separate them from the valve mechanism chamber S (FIG. 1) where the valve operating mechanism (not shown) is arranged.

As shown in FIGS. 4 and 5, the fresh air introduction passage 15, the vapor-liquid separating section 16, and the blow-by gas main passage 17 are oriented in the cylinder alignment direction and arranged along a side wall of the cylinder head cover 4 such that the fresh air introduction passage 15 is farthest from the side wall, the vapor-liquid separating section 16 is disposed between the fresh air introduction passage 15 and the blow-by gas main passage 17, and the blow-by gas main passage 17 is closest to the side wall. The cylinder head cover 4 is positioned such that the side wall of the cylinder head cover 4 that is oriented in the cylinder alignment direction and adjacent to the blow-by gas main passage 17 is arranged on the same side as the intake manifold mounting surface 3d of the cylinder head 3. The cylinder head cover 4 is mounted to the cylinder head 3 by inserting the bolts B through bolt holes 4b formed in the cylinder head cover 4 and screwing the bolts B into the bolt holes 3b of the cylinder head 3. A gasket 23 is arranged between the cylinder head cover mounting surface 3a of the cylinder head 3 and the cylinder head mounting surface 4a of the cylinder head cover 4. As shown in FIG. 5, the vapor liquid separating section 16 has a meandering portion and a portion having an enlarged volume.

Two protruding wall portions 4c are formed on the side wall of the cylinder head cover 4 that corresponds to the intake manifold mounting surface 3d in positions corresponding to the protruding wall portions 3c. As shown in FIGS. 4 and 5, the cylinder head cover 4 includes a communication passage 18 (a communication passage) provided in each of the protruding wall portions 4c, which passes from an outside surface of the protruding wall portion 4c to the blow-by gas main passage 17. The communication passages 18 of the protruding wall portions 4c are each blocked with a plug 19. Each of the protruding wall portions 4c also has a flow passage 20 that passes from the communication passage 18 to side of the protruding wall portion 4c corresponding to the cylinder head mounting surface 4a. The flow passages 20 are configured and arranged to connect to and communicate with the through holes 22 formed in the cylinder head 3 when the cylinder head cover 4 is mounted to the cylinder head 3.

The operational effects of an internal combustion engine 1 structured as described above will now be explained.

Blow-by gas that flows out from a gap between the piston 6 and the cylinder bore 5 into a crankcase (not shown) passes through the inside of the cylinder head 3 and flows into the vapor-liquid separating section 16 of the cylinder head cover 4 in a conventional manner.

Oil is removed effectively from the blow-by gas flowing into the vapor-liquid separating section 16 as the blow-by gas passes through the meandering portion and the enlarged volume portion of the vapor-liquid separating section 16. After having the oil removed, the blow-by gas passes from the blow-by gas main passage 17 to the communication passages 18 and then passes through the flow passages (blow-by gas guide passages) 20 and the through holes (blow-by gas recirculation passages) 22 and enters the recess portions 25a and 25c.

The blow-by gas flowing into the recess portions 25a and 25c passes through the communication grooves 26 extending leftward and rightward from the recess portions 25a and 25c and into the upper sub-passages 21a of the first to fourth intake passages 21A, 21B, 21C, and 21D. The blow-by gas is thereby recirculated to the intake ports 10 of the cylinders.

By directing blow-by gas to recess portions 25a and 25c (core-cast spaces) having comparatively large volumes, pressure pulsations inside the crankcase (not shown) can be sufficiently absorbed. As a result, the blow-by gas can be supplied to the intake ports 10 in a stable and uniform manner. Additionally, since the recess portions 25a and 25c provided for the purpose of improving the quality of the final product (e.g., reduction of the wall thickness and suppression of the occurrence of shrinkage cavities during casting) are also used for absorbing the pressure pulsations, it is not necessary to provide a separate part for absorbing the pressure pulsations. As a result, a structure for recirculating blow-by gas in a stable and uniform manner can be secured in an efficient fashion.

Since the blow-by gas recirculation structure of the illustrated embodiment includes merely the recess portions 25a and 25c and the communication grooves 26 formed in the intake manifold mounting surface 3d of the cylinder head 3, a structure for recirculating blow-by gas entering the recess portions 25a and 25c to the first to fourth intake passages 21A, 21B, 21C, and 21D can be secured in a simple fashion.

Additionally, even if the first to fourth intake passages 21A, 21B, 21C, and 21D are partitioned into a plurality of sub-passages 21a and 21b such that the flow state of the intake air flowing to the combustion chambers C can be changed between, for example, a tumbling flow state and a swirling flow state, blow-by gas can always be recirculated because the recess portions 25a and 25c are in communication with the sub-passages 21a in which intake air always flows.

In the embodiment described above, the communication grooves 26 are formed in the intake manifold mounting surface 3d of the cylinder head 3 onto which the intake manifold 11 is mounted. However, it is also acceptable to form the communication grooves in the cylinder head mounting surface 11b of the intake manifold 11.

Figure 6:
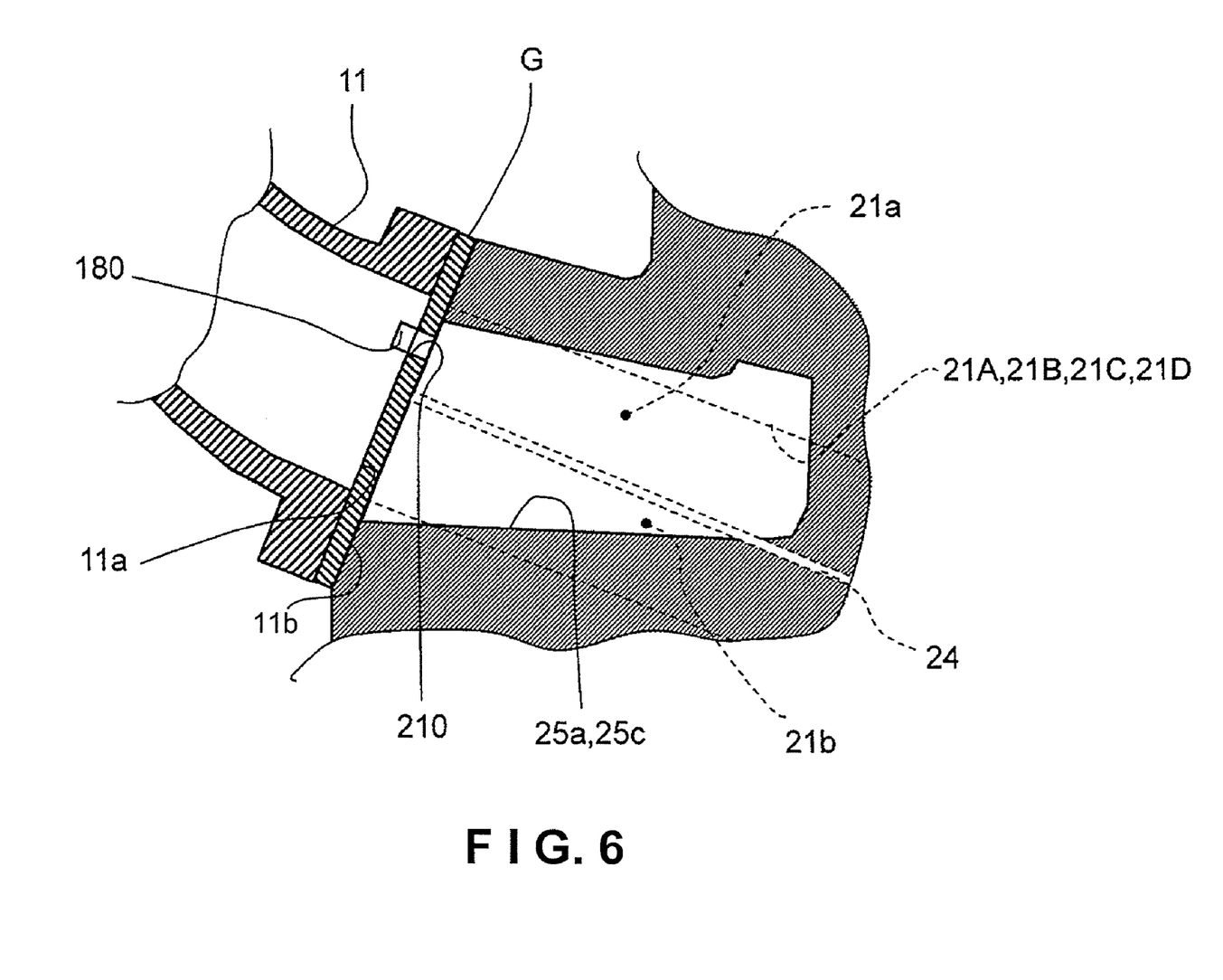
FIG. 6 is a schematic enlarged partial cross sectional view of a portion of a cylinder head in the vicinity of a recess portion according to a modified embodiment of the present invention.
Figure 7:
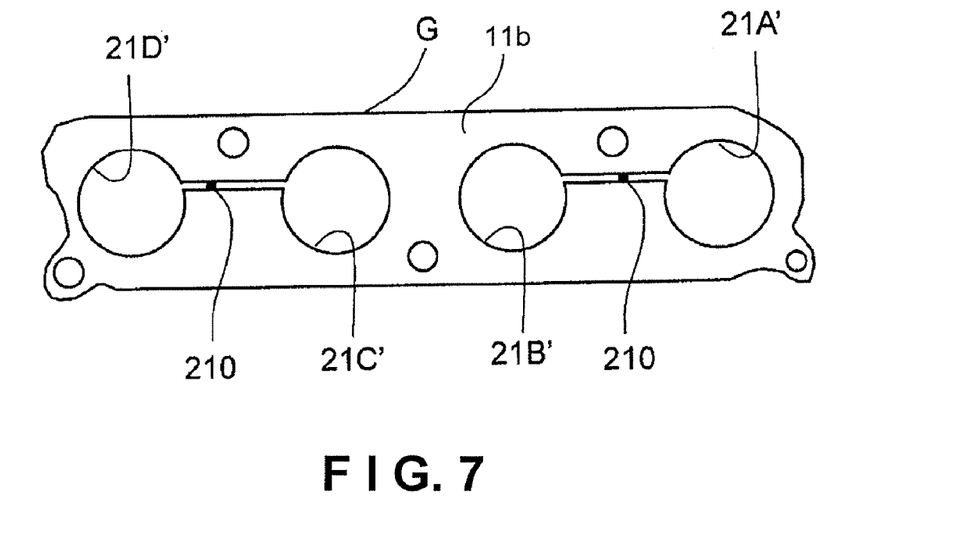
FIG. 7 is a schematic view of a gasket disposed between the cylinder head and an intake manifold according to the modified embodiment of the present invention.
Figure 8:
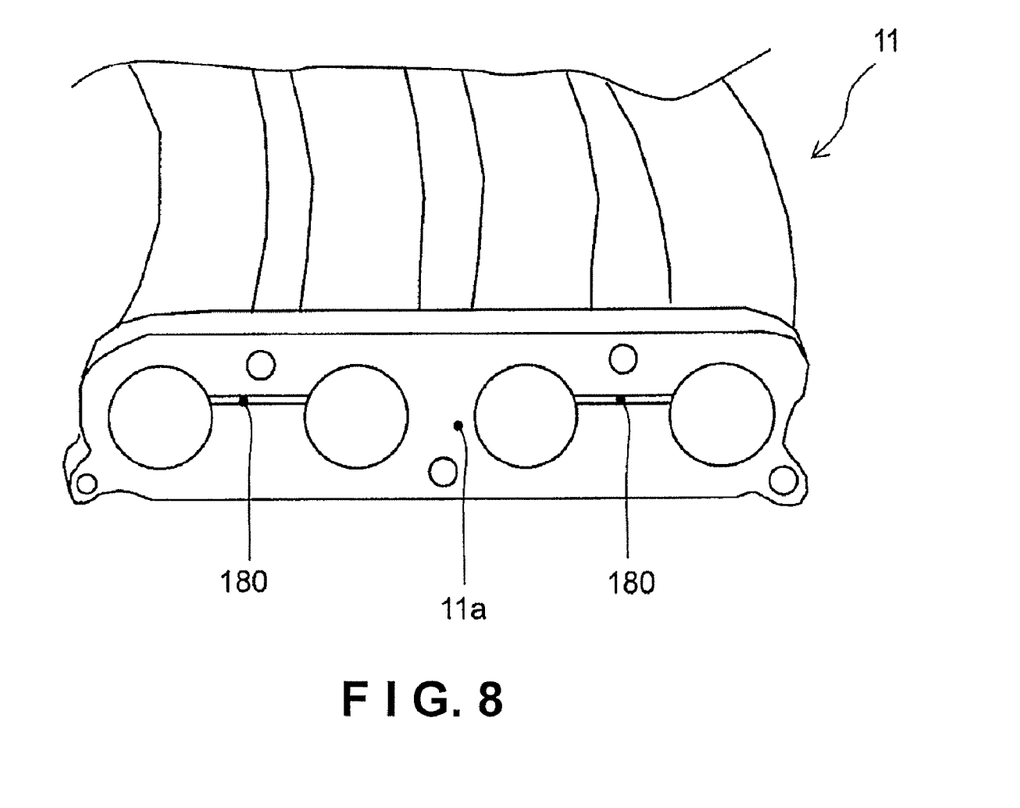
FIG. 8 is an enlarged view of a mounting flange portion of the intake manifold according to the modified embodiment of the present invention.

FIG. 6 is an enlarged cross sectional view of a portion in the vicinity of the recess portion 25a or 25c, FIG. 7 is a schematic view of the gasket G, and FIG. 8 is an enlarged view of the mounting flange portion 11a of the intake manifold 11.

As shown in FIGS. 6 and 8, two communication grooves 180 are formed in the mounting flange portion 11a of the intake manifold 11. The gasket G has openings 21A', 21B', 21C', and 21D' corresponding to the first to fourth intake passages 21A, 21B, 21C, and 21D, respectively, and two connection openings 210 (communication grooves) that connect between the openings 21A' and 21B' and between the openings 21C' and 21D'.

Furthermore, it is also acceptable to provide neither communication grooves 26 in the intake manifold mounting surface 3d nor the communication grooves 180 in the mounting flange portion 11a and only provide the connection openings 210 in the gasket G, or to provide both of the communication grooves 26 in the intake manifold mounting surface 3d and the communication grooves 180 in the mounting flange portion 11a as well as the connection openings 210 in the gasket G.

Although, in the illustrated embodiment, the communication grooves 26 communicate between the upper sub-passages 21a of the first and second intake passages 21A and 21B and the recess portion 25a and between the upper sub-passages 21a of the third and fourth intake passages 21C and 21D and the recess portion 25c, it is also acceptable for the communication grooves 26 to be configured and arranged to communicate between the lower sub-passages 21b of the first and second intake passages 21A and 21B and the recess portion 25a and between the lower sub-passages 21b of the third and fourth intake passages 21C and 21D and the recess portion 25c. In such a case, control should be executed such that blow-by gas is only recirculated when intake air is flowing in the lower sub-passages 21b.

Although, in the illustrated embodiment, the vapor-liquid separating section 16 is formed inside the cylinder head cover 4, it is also acceptable for the vapor-liquid separating section 16 to be provided as a vapor-liquid separating device that is separate from the cylinder head cover 4.

In the blow-by gas recirculation structure according to the illustrated embodiment, the enlarged recess (the recess portion 25a or 25c) having comparatively large volumes is formed between the intake openings of the intake passages 21A and 21B or between the intake openings of the intake passages 21C and 21D, which generally have thick walls for structural reasons. As a result, the wall-thickness between the intake passages 21A and 21B or between the intake passages 21C and 21D can be made smaller and the occurrence of shrinkage cavities can be suppressed during casting.

Additionally, pressure pulsations in the crankcase can be absorbed because the blow-by gas is recirculated to the intake passages 21A, 21B, 21C and 21D through the enlarged recesses (the recess portions 25a and 25c) having comparatively large volumes. Furthermore, since enlarged recesses (the recess portions 25a and 25c) provided for the purpose of improving the quality of the final product are used for absorbing the pressure pulsations, a structure enabling blow-by gas to be supplied to the intake passages 21A, 21B, 21C and 21D in a stable and uniform manner can be secured in an efficient fashion.

In the blow-by gas recirculation structure according to the illustrated embodiment, the communication groove 26 fluidly connects between the intake passages 21A and 21B or between the intake passages 21C and 21D and the enlarged recess (the recess portion 25a or 25c) is formed in the intake manifold mounting surface 3d of the cylinder head 3 and/or in the cylinder head mounting surface 11b of the intake manifold 11 such that blow-by gas that flows into the enlarged recess (the recess portion 25a or 25c) is recirculated to the intake passages 21A and 21B or the intake passages 21C and 21D through the communication groove 26.

In this way, a structure for recirculating blow-by gas from the recess portion 25a or 25c to the air induction system can be secured easily by simply forming a groove configured to communicate between the intake passages and the recess portion 25a or 25c in the intake manifold mounting surface 3d of the cylinder head 3 and/or the cylinder head mounting surface 11b of the intake manifold 11.

In the blow-by gas recirculation structure according to the illustrated embodiment, the communication groove 26 can be formed to communicate between the recess portion 25a or 25c and the two intake passages 21A and 21B or the two intake passages 21C and 21D on both sides of the recess portion 25a or 25c.

In this way, the blow-by gas that flows into the recess portion 25a or 25c can be recirculated simultaneously to the two intake passages 21A and 21B or the two intake passages 21C and 21D on both sides of the recess portion 25a or 25c.

In the blow-by gas recirculation structure according to the illustrated embodiment, each of the intake passages 21A, 21B, 21C and 21D includes the partition (the tumble plate 24) defining at least two sub-passages 21a and 21b to change a flow state of an intake air flowing through the intake passages 21A, 21B, 21C and 21D, and the communication groove 26 communicates between the recess portion 25a or 25c and the sub-passages 21a to which intake air is always supplied among the plurality of sub-passages 21a of each intake passage 21A, 21B, 21C and 21D.

In this way, even if, for example, the intake passages 21A, 21B, 21C and 21D partitioned into a plurality of sub-passages such that the flow state of the intake air can be changed between a tumbling flow state and a swirling flow state, blow-by gas can always be recirculated because the communication groove 26 communicates between the recess portion 25a or 25c and the sub-passages 21a in which intake air always flows.

In the blow-by gas recirculation structure according to the illustrated embodiment, the cylinder head cover 4 is mounted to the cylinder head cover mounting surface 3c of the cylinder head 3. The cylinder head cover 4 includes the vapor-liquid separator passage (the vapor-liquid separating section 16) arranged to separate oil from the blow-by gas, the communication passages 18 fluidly connected to the vapor-liquid separator passage (the vapor-liquid separating section 16), and the flow passages 20 fluidly connecting the communication passages 18 to the blow-by gas passages (the through holes 22) of the cylinder head 3 such that the blow-by gas fed to the flow passages 20 from the vapor-liquid separator passage (the vapor-liquid separating section 16) is recirculated from the blow-by gas passages (the through holes 22) to the intake passages 21A, 21B, 21C and 21D through the recess portions 25a and 25b.

In this way, blow-by gas can be recirculated to the intake passages 21A, 21B, 21C and 21D without providing an external pipe.

The internal combustion engine 1 according to the illustrated embodiment employs the blow-by gas recirculation structure according to the illustrated embodiment to recirculate blow-by gas that escapes through a gap between the piston 6 and the cylinder bore 5 to an air induction system of the internal combustion engine 1.

Since the internal combustion engine 1 is provided with the blow-by gas recirculation structure in accordance with the illustrated embodiment, it exhibits the same effects as the blow-by gas recirculation structure in accordance with the illustrated embodiment. For example, a structure enabling blow-by gas to be supplied to the intake passages in a stable and uniform manner can be secured efficiently.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of an internal combustion engine equipped with the present invention. Accordingly, these terms, as utilized to describe the present invention should be interpreted relative to the internal combustion engine when it is placed so that cylinder center axes are oriented in a substantially vertical direction. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A blow-by gas recirculation structure comprising:
   a cylinder head including an intake manifold mounting surface and a cylinder block mounting surface with a first intake passage extending between a first intake opening formed in the intake manifold mounting surface and a first intake port formed in the cylinder block mounting surface, and a second intake passage extending between a second intake opening formed in the intake manifold mounting surface and a second intake port formed in the cylinder block mounting surface,
   the cylinder head further including at least one blow-by gas passage for recirculating blow-by gas to the first intake passage,
   the intake manifold mounting surface further having at least one enlarged recess fluidly connected between the blow-by gas passage and the first intake passage, the enlarged recess being disposed between the first and second intake openings and at least partially aligned with centers of the first and second intake openings, and
   the enlarged recess having a depth of at least forty percent of a length of the first and second intake passages as measured from the intake manifold mounting surface to the cylinder block mounting surface.

2. The blow-by gas recirculation structure as recited in claim 1, wherein
   the intake manifold mounting surface further includes at least one communication groove fluidly connecting the first intake passage to the enlarged recess such that the blow-by gas that flows into the enlarged recess is recirculated to the first intake passage through the communication groove.

3. The blow-by gas recirculation structure as recited in claim 2, wherein
   the communication groove fluidly connects both of the first and second intake passages to the enlarged recess that is disposed between the first and second intake passages.

4. The blow-by gas recirculation structure as recited in claim 2, wherein
   each of the first and second intake passages includes a partition defining at least two sub-passages to change a flow state of an intake air flowing through the first and second intake passages with one of the sub-passages being arranged to always allow passage of the intake air while the other of the sub-passages being arranged to be selectively closed off, and
   the communication groove fluidly connects the one of the sub-passages arranged to always allow passage of the intake air to the enlarged recess.

5. The blow-by gas recirculation structure as recited in claim 1, further comprising
   a cylinder head cover mounted to a cylinder head cover mounting surface of the cylinder head, with the cylinder head cover having a vapor-liquid separator passage arranged to separate oil from the blow-by gas, a communication passage fluidly connected to the vapor-liquid separator passage, and a flow passage fluidly connecting the communication passage to the blow-by gas passage of the cylinder head such that the blow-by gas fed to the flow passage from the vapor-liquid separator passage is recirculated from the blow-by gas passage to the first intake passage through the enlarged recess.

6. The blow-by gas recirculation structure as recited in claim 1, wherein
   the cylinder head further includes a third intake passage extending between a third intake opening formed in the intake manifold mounting surface and a third intake port formed in the cylinder block mounting surface, and a fourth intake passage extending between a fourth intake opening formed in the intake manifold mounting surface and a fourth intake port formed in the cylinder block mounting surface, and
   the intake manifold mounting surface further has an additional enlarged recess fluidly connected between an additional blow-by gas passage and the third intake passage, the additional enlarged recess being disposed between the third and fourth intake openings and at least partially aligned with centers of the third and fourth intake openings.

7. The blow-by gas recirculation structure as recited in claim 6, wherein
   the intake manifold mounting surface further includes a communication groove that fluidly connects both of the first and second intake passages to the enlarged recess that is disposed between the first and second intake passages, and
   the intake manifold mounting surface further includes an additional communication groove that fluidly connects both of the third and fourth intake passages to the additional enlarged recess that is disposed between the third and fourth intake passages.

8. The blow-by gas recirculation structure as recited in claim 1, further comprising
   an intake manifold having a cylinder head mounting surface mounted to the intake manifold mounting surface of the cylinder head,
   at least one of the intake manifold mounting surface and the cylinder head mounting surface having at least one communication groove fluidly connecting the first intake passage to the enlarged recess such that the blow-by gas that flows into the enlarged recess is recirculated to the first intake passage through the communication groove.

9. The blow-by gas recirculation structure as recited in claim 8, wherein
   the cylinder head mounting surface of the intake manifold has the communication groove.

10. The blow-by gas recirculation structure as recited in claim 9, wherein
    the communication groove fluidly connects both of the first and second intake passages to the enlarged recess that is disposed between the first and second intake passages.

11. The blow-by gas recirculation structure as recited in claim 9, wherein
    each of the first and second intake passages includes a partition defining at least two sub-passages to change a flow state of an intake air flowing through the first and second intake passages with one of the sub-passages being arranged to always allow passage of the intake air while the other of the sub-passages being arranged to be selectively closed off, and the communication groove fluidly connects the one of the sub-passages arranged to always allow passage of the intake air to the enlarged recess.

12. The blow-by gas recirculation structure as recited in claim 9, further comprising a cylinder head cover mounted to a cylinder head cover mounting surface of the cylinder head, with the cylinder head cover having a vapor-liquid separator passage arranged to separate oil from the blow-by gas, a communication passage fluidly connected to the vapor-liquid separator passage, and a flow passage fluidly connecting the communication passage to the blow-by gas passage of the cylinder head such that the blow-by gas fed to the flow passage from the vapor-liquid separator passage is recirculated from the blow-by gas passage to the first intake passage through the enlarged recess.

13. The blow-by gas recirculation structure as recited in claim 9, wherein the enlarged recess has a width as measured perpendicular to a line connecting centers of the first and second intake openings that is at least fifty percent of a width of the first and second intake openings as measured perpendicular to the line connecting centers of the first and second intake openings.

14. The blow-by gas recirculation structure as recited in claim 9, wherein the cylinder head further includes a third intake passage extending between a third intake opening formed in the intake manifold mounting surface and a third intake port formed in the cylinder block mounting surface, and a fourth intake passage extending between a fourth intake opening formed in the intake manifold mounting surface and a fourth intake port formed in the cylinder block mounting surface, and the intake manifold mounting surface further has an additional enlarged recess fluidly connected between an additional blow-by gas passage with the third intake passage, the additional enlarged recess being disposed between the third and fourth intake openings and at least partially aligned with centers of the third and fourth intake openings.

15. The blow-by gas recirculation structure as recited in claim 14, wherein the communication groove fluidly connects both of the first and second intake passages to the enlarged recess that is disposed between the first and second intake passages, and the cylinder head mounting surface further includes an additional communication groove that fluidly connects both of the third and fourth intake passages to the additional enlarged recess that is disposed between the third and fourth intake passages.

16. An internal combustion engine including the blow-by gas recirculation structure as recited in claim 1, wherein the internal combustion engine includes a cylinder block having a piston and a cylinder bore in which the blow-by gas escaping through a gap between the piston and the cylinder bore is recirculated to an air induction system of the internal combustion engine.

17. A blow-by gas recirculation structure comprising:

a cylinder head including an intake manifold mounting surface and cylinder block mounting surface with a first intake passage extending between a first intake opening formed in the intake manifold mounting surface and a first intake port formed in the cylinder block mounting surface, and a second intake passage extending between a second intake opening formed in the intake manifold mounting surface and a second intake port formed in the cylinder block mounting surface, the cylinder head further including at least one blow-by gas passage for recirculating blow-by gas to the first intake passage, the intake manifold mounting surface further having at least one enlarged recess fluidly connected between the blow-by gas passage and the first intake passage, the enlarged recess being disposed between the first and second intake openings and at least partially aligned with centers of the first and second intake openings, and the enlarged recess having a width as measured perpendicular to a line connecting centers of the first and second intake openings that is at least fifty percent of a width of the first and second intake openings as measured perpendicular to the line connecting centers of the first and second intake openings.

18. The blow-by gas recirculation structure as recited in claim 17, wherein the enlarged recess has a depth of at least twenty percent of a length of the first and second intake passages as measured from the intake manifold mounting surface to the cylinder block mounting surface.

19. The blow-by gas recirculation structure as recited in claim 17, wherein the depth of the enlarged recess is at least forty percent of the length of the first and second intake passages.

20. The blow-by gas recirculation structure as recited in claim 17, wherein the intake manifold mounting surface further includes at least one communication groove fluidly connecting the first intake passage to the enlarged recess such that the blow-by gas that flows into the enlarged recess is recirculated to the first intake passage through the communication groove.

21. The blow-by gas recirculation structure as recited in claim 20, wherein the communication groove fluidly connects both of the first and second intake passages to the enlarged recess that is disposed between the first and second intake passages.

22. The blow-by gas recirculation structure as recited in claim 20, wherein each of the first and second intake passages includes a partition defining at least two sub-passages to change a flow state of an intake air flowing through the first and second intake passages with one of the sub-passages being arranged to always allow passage of the intake air while the other of the sub-passages being arranged to be selectively closed off, and the communication groove fluidly connects the one of the sub-passages arranged to always allow passage of the intake air to the enlarged recess.

23. The blow-by gas recirculation structure as recited in claim 17, further comprising a cylinder head cover mounted to a cylinder head cover mounting surface of the cylinder head, with the cylinder head cover having a vapor-liquid separator passage arranged to separate oil from the blow-by gas, a communication passage fluidly connected to the vapor-liquid separator passage, and a flow passage fluidly connecting the communication passage to the blow-by gas passage of the cylinder head such that the blow-by gas fed to the flow passage from the vapor-liquid separator passage is recirculated from the blow-by gas passage to the first intake passage through the enlarged recess.

24. The blow-by gas recirculation structure as recited in claim 17, wherein
the cylinder head further includes a third intake passage extending between a third intake opening formed in the intake manifold mounting surface and a third intake port formed in the cylinder block mounting surface, and a fourth intake passage extending between a fourth intake opening formed in the intake manifold mounting surface and a fourth intake port formed in the cylinder block mounting surface, and
the intake manifold mounting surface further has an additional enlarged recess fluidly connected between an additional blow-by gas passage and the third intake passage, the additional enlarged recess being disposed between the third and fourth intake openings and at least partially aligned with centers of the third and fourth intake openings.

25. The blow-by gas recirculation structure as recited in claim 24, wherein
the intake manifold mounting surface further includes a communication groove that fluidly connects both of the first and second intake passages to the enlarged recess that is disposed between the first and second intake passages, and
the intake manifold mounting surface further includes an additional communication groove that fluidly connects both of the third and fourth intake passages to the additional enlarged recess that is disposed between the third and fourth intake passages.

26. The blow-by gas recirculation structure as recited in claim 17, further comprising
an intake manifold having a cylinder head mounting surface mounted to the intake manifold mounting surface of the cylinder head,
at least one of the intake manifold mounting surface and the cylinder head mounting surface having at least one communication groove fluidly connecting the first intake passage to the enlarged recess such that the blow-by gas that flows into the enlarged recess is recirculated to the first intake passage through the communication groove.

27. The blow-by gas recirculation structure as recited in claim 26, wherein
the cylinder head mounting surface of the intake manifold has the communication groove.

28. The blow-by gas recirculation structure as recited in claim 27, wherein
the communication groove fluidly connects both of the first and second intake passages to the enlarged recess that is disposed between the first and second intake passages.

29. The blow-by gas recirculation structure as recited in claim 27, wherein
each of the first and second intake passages includes a partition defining at least two sub-passages to change a flow state of an intake air flowing through the first and second intake passages with one of the sub-passages being arranged to always allow passage of the intake air while the other of the sub-passages being arranged to be selectively closed off, and
the communication groove fluidly connects the one of the sub-passages arranged to always allow passage of the intake air to the enlarged recess.

30. The blow-by gas recirculation structure as recited in claim 27, further comprising
a cylinder head cover mounted to a cylinder head cover mounting surface of the cylinder head, with the cylinder head cover having a vapor-liquid separator passage arranged to separate oil from the blow-by gas, a communication passage fluidly connected to the vapor-liquid separator passage, and a flow passage fluidly connecting the communication passage to the blow-by gas passage of the cylinder head such that the blow-by gas fed to the flow passage from the vapor-liquid separator passage is recirculated from the blow-by gas passage to the first intake passage through the enlarged recess.

31. The blow-by gas recirculation structure as recited in claim 27, wherein
the enlarged recess has a depth of at least twenty percent of a length of the first and second intake passages as measured from the intake manifold mounting surface to the cylinder block mounting surface.

32. The blow-by gas recirculation structure as recited in claim 27, wherein
the cylinder head further includes a third intake passage extending between a third intake opening formed in the intake manifold mounting surface and a third intake port formed in the cylinder block mounting surface, and a fourth intake passage extending between a fourth intake opening formed in the intake manifold mounting surface and a fourth intake port formed in the cylinder block mounting surface, and
the intake manifold mounting surface further has an additional enlarged recess fluidly connected between an additional blow-by gas passage with the third intake passage, the additional enlarged recess being disposed between the third and fourth intake openings and at least partially aligned with centers of the third and fourth intake openings.

33. The blow-by gas recirculation structure as recited in claim 32, wherein
the communication groove fluidly connects both of the first and second intake passages to the enlarged recess that is disposed between the first and second intake passages, and
the cylinder head mounting surface further includes an additional communication groove that fluidly connects both of the third and fourth intake passages to the additional enlarged recess that is disposed between the third and fourth intake passages.

34. An internal combustion engine including the blow-by gas recirculation structure as recited in claim 17, wherein
the internal combustion engine includes a cylinder block having a piston and a cylinder bore in which the blow-by gas escaping through a gap between the piston and the cylinder bore is recirculated to an air induction system of the internal combustion engine.

* * * * *